United States Patent [19]
Nozaki

[11] Patent Number: 5,715,632
[45] Date of Patent: Feb. 10, 1998

[54] WEATHER STRIP

[75] Inventor: Masahiro Nozaki, Aichi-ken, Japan

[73] Assignee: Toyoda Gosei Co., Ltd., Aichi, Japan

[21] Appl. No.: 600,423

[22] Filed: Feb. 13, 1996

[30] Foreign Application Priority Data

Feb. 13, 1995 [JP] Japan ................................. 7-047770

[51] Int. Cl.⁶ ........................................................ E06B 7/16
[52] U.S. Cl. ................................... 49/475.1; 49/498.1
[58] Field of Search ..................... 49/475.1, 498.1, 49/495.1

[56] References Cited

U.S. PATENT DOCUMENTS

| | | | |
|---|---|---|---|
| 2,705,655 | 4/1955 | Brown et al. | 49/495.1 X |
| 3,926,469 | 12/1975 | Ulics | 49/495.1 X |
| 5,093,968 | 3/1992 | Rojdev et al. | 49/475.1 X |
| 5,149,169 | 9/1992 | Nozaki . | |
| 5,154,952 | 10/1992 | Nozaki . | |
| 5,304,409 | 4/1994 | Nozaki . | |
| 5,343,655 | 9/1994 | Miyakawa et al. | 49/475.1 X |
| 5,356,194 | 10/1994 | Takeuchi . | |
| 5,449,544 | 9/1995 | Ogawa et al. . | |

FOREIGN PATENT DOCUMENTS 1-229718  9/1989  Japan .

*Primary Examiner*—Blair Johnson
*Assistant Examiner*—Curtis Cohen
*Attorney, Agent, or Firm*—Cushman Darby & Cushman, IP Group of Pillsbury Madison & Sutro LLP

[57] ABSTRACT

A weather strip is secured to an outer peripheral surface of a door frame of a motor vehicle by a double-sided adhesive tape. The weather strip has a bottom surface on a base portion with at least one continuous rib thereon extending in a longitudinal direction of the weather strip. The at least one projecting rib enables a continuous and aligned seal line to be formed.

6 Claims, 3 Drawing Sheets

WEATHER STRIP

BACKGROUND OF THE INVENTION

1. Field of the Invention

The present invention relates to a weather strip for motor vehicles, and in particular to a weather strip for motor vehicles which is secured thereto with a double-sided adhesive tape.

2. Description of Related Art

A weather strip is secured to and along the edge of door openings and also to the outer periphery of the corresponding door member, such as the passenger door, for example.

In general, a weather strip is conventionally secured by providing a metal retainer along the door openings and/or the door, then fitting a base portion of the weather strip into the retainer. However, adhering a weather strip by means of a double-sided adhesive tape has recently been carried out, instead of using a metal retainer (refer to Japanese Unexamined Patent Publication No. Hei 1-229718, for example).

A conventional weather strip which is secured to the outer periphery of a door frame is shown in FIG. 4. The weather strip 3 is adhered at is base portion 31 to the outer peripheral surface 11 of the door frame 1 via a double-sided adhesive tape 6. When the door is closed, a seal portion 32 of weather strip 3 is deflected by an edge of the door opening 21 of the vehicle body, as seen in phantom in FIG. 4.

Using the double-sided adhesive tape to fasten the weather strip is generally advantageous in cost. It also helps reduce the weight of the vehicle, compared to the weight of the metal retainer. However, certain problems do occur. For example, the surfaces of the door frame and the door opening edge on which the weather strip is applied are curved at their corners and are generally locally irregular in surface shape. A double-sided adhesive tape is first adhered to the bottom surface of the base of the weather strip. The weather strip is then secured to the bonding surface by continuously pressing the base portion thereto.

However, spaces may be locally formed between the adhesive tape and the bonding surface because of the above-mentioned curvature and irregularities of the bonding surface. This creates a problem because the double-sided adhesive tape is intended to adhere the weather strip to the bonding surface and to serve as a seal between the weather strip and the bonding surface. If the seal is interrupted due to gaps or spaces between the adhesive tape and the bonding surface, however, vehicle washing water and the like may enter (i.e., leak into) the inside of the vehicle via the gaps or spaces.

Another problem is that the adhesive tape may be adhered to and along the base portion of the weather strip in a zigzag manner relative to the weather strip, and not in rectilinear alignment therewith, thereby degrading adhesion strength.

SUMMARY OF THE INVENTION

Therefore, the present invention was made to overcome the above-mentioned problems. An object of the present invention is to provide a weather strip in which the seal between the double-sided adhesive tape and the surface to which the weather strip is applied is substantially continuous, so that the double-side adhesive tape can be adhered on the bottom of the base portion of the weather strip in an accurate position with easy handling characteristics.

In accordance with the present invention, a weather strip is secured at the edge of an opening, such as a door opening, and/or the outer periphery of an opening and closing member, such as a door, with a double-sided adhesive tape. The weather strip has at least one projecting rib on the bottom surface of its base portion in a longitudinal direction (along the length of the weather strip). The projecting rib preferably has a height less than the thickness of the double-sided adhesive tape.

The projecting rib may preferably be triangular or chevron-shaped in cross-section and may have a width larger than its height.

A single projecting rib may be formed on the bottom of the base portion of the weather strip, preferably in a position close to the edge of the weather strip adjacent to the exterior of the vehicle body.

In another arrangement according to the present invention, two projecting ribs may be formed on the bottom of the base portion of the weather strip adjacent to the opposing longitudinal edges of the weather strip, respectively.

Other objects, features, and characteristics of the present invention will become apparent upon consideration of the following description in the appended claims with reference to the accompanying drawings, all of which form a part of the specification, and wherein referenced numerals designate corresponding parts in the various figures.

DETAILED DESCRIPTION OF THE PREFERRED EMBODIMENTS

Figure 1A:
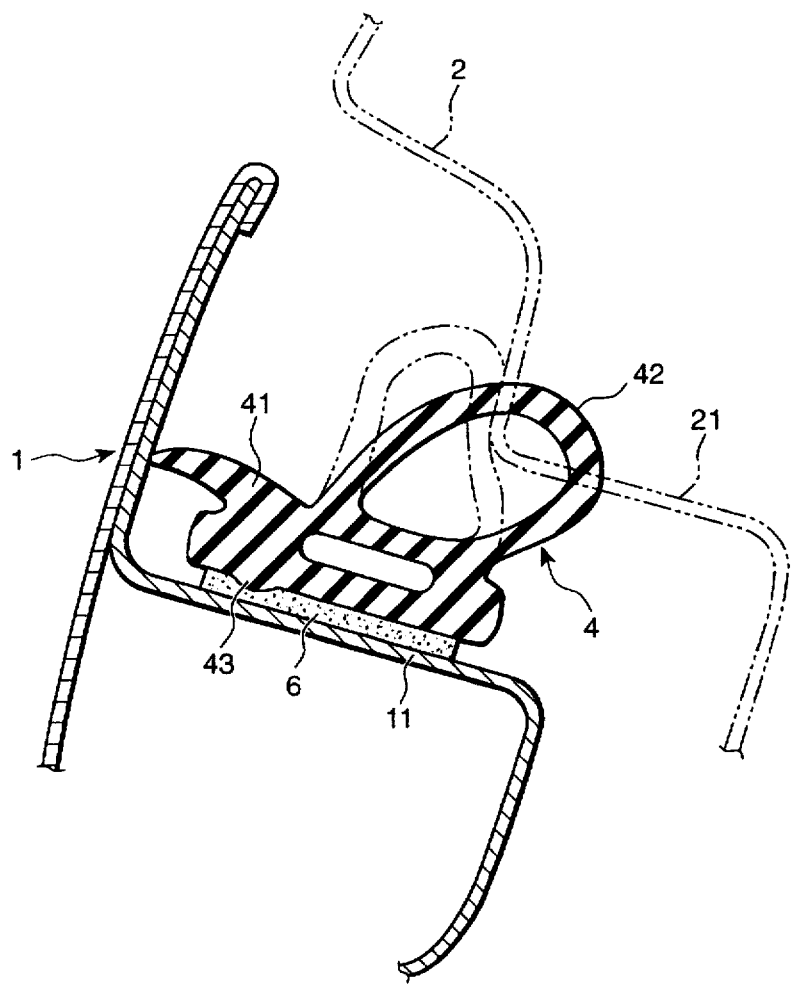
FIG. 1(A) is a sectional view showing a first embodiment of a weather strip of the present invention.
Figure 1B:
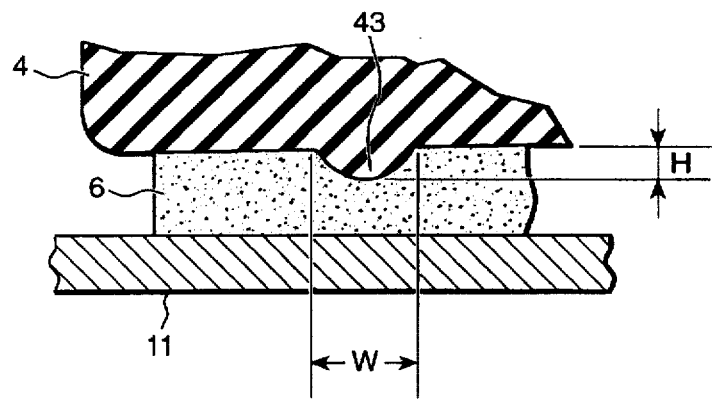
FIG. 1(B) is an enlarged sectional view showing a main part of the weather strip shown in FIG. 1(A)

Referring now to FIGS. 1(A) and 1(B), a weather strip 4 of the present invention is shown secured to a door frame 1, for example. The weather strip 4 is generally an extruded product, preferably made from rubber or another suitably resilient material. The weather strip 4 comprises a base portion 41 and a generally hollow seal portion 42 which are integral with each other. The base portion 41 of weather strip 4 is preferably continuously adhered to the outer peripheral surface of the door frame 1 via a double-sided adhesive tape 6. When the door is closed, the seal portion 42 is deflected by an edge 21 of the door extending along a roof side 2 of a vehicle body. The weather strip 4 has a continuous raised or projecting rib 43 on the bottom surface of the base 41, preferably in a position close to the side edge adjacent to the outside of the vehicle. The rib 43 is, for example, triangular in cross-section and has a height which is less than the thickness of the double-sided adhesive tape 6. In the illustrated case, the rib 43 has a height which is approximately half the thickness of the tape 6 (see FIG. 1(B)).

In order to secure the weather strip 4 to the door frame 1, the adhesive tape 6 is, for example, preliminarily adhered to the bottom surface of the base portion 41. Precise and rectilinearly aligned adhesion of the tape 6, relative to weather strip 4, is accomplished by using the projecting rib 43 as a positioning reference. The weather strip 4 is secured to the outer peripheral surface 11 of the door frame 1 via the double-sided adhesion tape 6 by continuously pressing the base portion having the adhesive tape 6 adhered thereto onto the outer peripheral surface 11 of the door frame 1.

On application of the weather strip 4, the double-sided adhesive tape 6 is pressed with and along the projecting rib 43 so that a rectilinear seal line is formed which is more strongly biased upon and adhered to the outer peripheral surface 11 than other portions of the weather strip. Accordingly, even if adhesion spaces form at portions other than the seal line, continuous sealing properties are assured.

Figure 2:
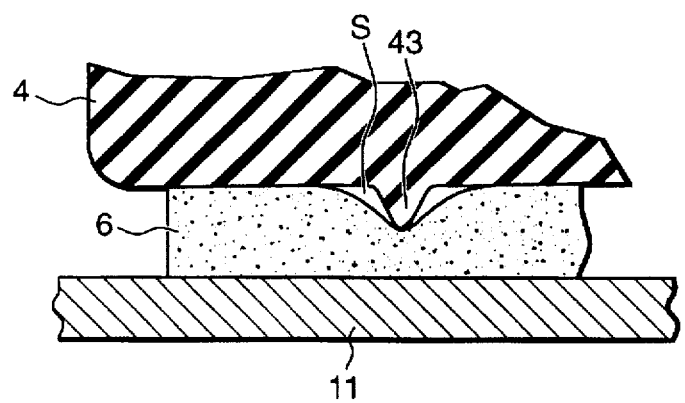
FIG. 2 is a view corresponding to FIG. 1(B), showing a space which is formed between the weather strip and an adhesive tape.

It is preferable to form the projecting rib 43 on the bottom of the base portion 41 in a position close to the outside of the vehicle body to provide preferable sealing properties. It is also preferable that the rib 43 have a width W larger than the height H, as shown in FIG. 1(B), since a space S may be formed between the adhesive tape 6 and the weather strip 4 on one or both sides of the projecting rib 43 (see FIG. 2). Also, separation of the tape 6 may spread from the space S, although the seal line between the adhesive tape 6 and the outer peripheral surface 11 of the door frame if the height of the rib 4 is larger than the depth as shown in FIG. 1(B). Increased adhesion between the projecting rib 43 and the double-sided adhesive tape 6 is obtained by making the width of the rib 43 relatively larger than its height.

The projecting rib 43 may be triangular, rounded, or chevron-shaped in cross-section.

Figure 3:
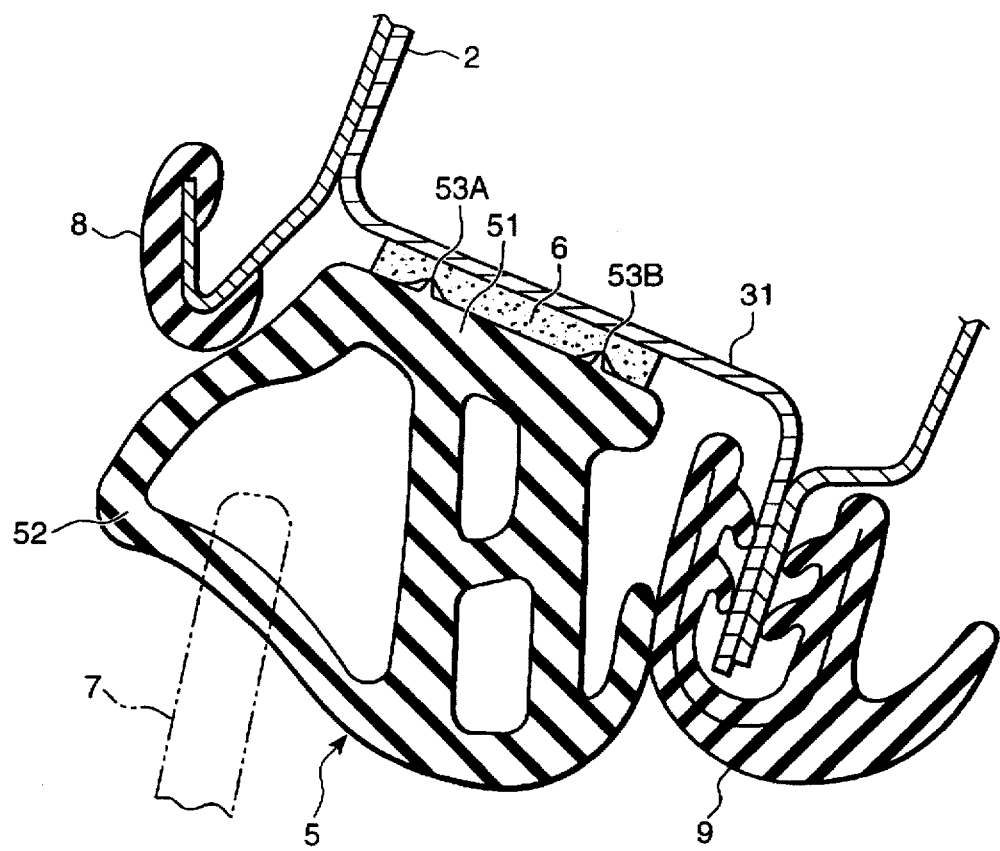
FIG. 3 is a sectional view showing a second embodiment of the weather strip of the present invention.
Figure 4:
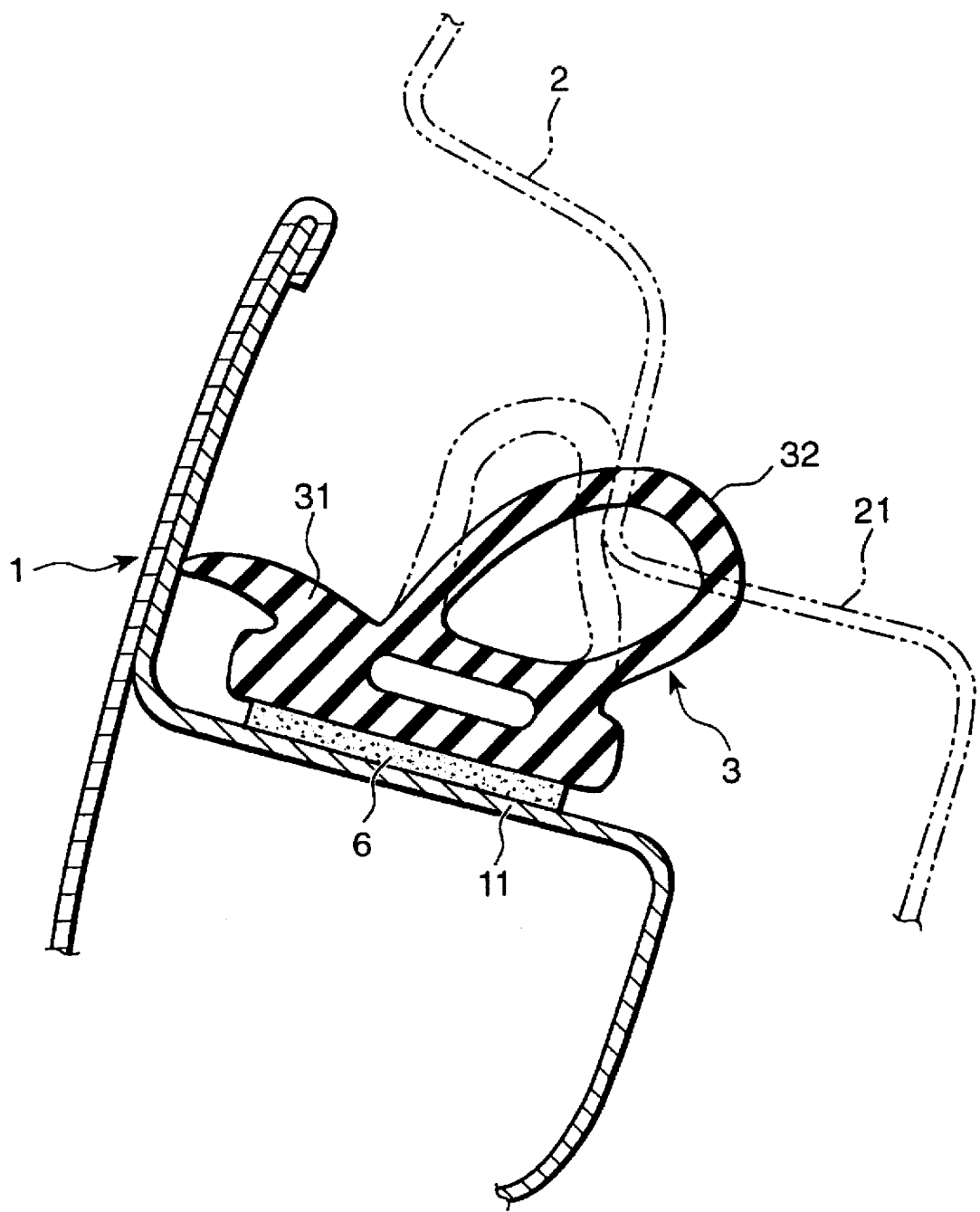
FIG. 4 is a sectional view illustrating a conventional weather strip.

Referring now to FIG. 3, another embodiment is illustrated in which the present invention is applied to a weather strip which is secured to the edge of door opening edge 21 along the roof side 2 of a frameless door. The weather strip 5 comprises a base portion 51 and a seal portion 52, and is generally hollow. The base portion 51 is adhered to the peripheral surface of the door opening edge 21 with a double-sided adhesive tape 6. When the door is closed, the peripheral edge of the door window glass 7 abuts and deflects the seal portion 52. The weather strip 5 is generally continuously formed with two parallel projecting ribs 53A and 53B on the bottom surface of the base portion 51 along both side edges (i.e., towards the inside and outside of the vehicle body). This forms two parallel seal lines between the double-sided adhesive tape 6 and the peripheral surface of the door opening edge 31. In the drawing, reference numerals 8 and 9 denote a roof side molding and a door opening trim, respectively.

In this embodiment, therefore, desirable sealing properties can be positively obtained with two seal lines. Positioning the adhesive tape 6 on the bottom surface of the base portion 51 of the weather strip is also easy and accurate.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A weather strip for forming a seal between a first member in a motor vehicle body and an opposing second member, the weather strip comprising:

an elongate base portion having a bottom surface, said bottom surface of said base portion including at least one outwardly extending rib, having a height "H", formed thereon in a longitudinal direction and adjacent an outer edge thereof;

a sealing portion extending from said base portion; and an adhesive tape having opposing adhesive faces and a thickness that is greater than said rib height H, wherein one of said adhesive faces is adhered to said bottom surface of said base portion, said adhesive tape being in substantial alignment with and in covering contact said at least one rib along said longitudinal direction, wherein the other of said adhesive faces is adapted to be adhered to one of the first and second members.

2. A weather strip according to claim 1, wherein said at least one rib is triangular in cross-section.

3. A weather strip according to claim 1, wherein said at least one rib is substantially rounded in cross-section.

4. A weather strip according to claim 1, wherein said at least one rib has a height dimension and a width dimension which is larger than said height dimension.

5. A weather strip according to claim 1, comprising two said ribs formed on said bottom surface of said base portion adjacent to opposing edges of said base portion.

6. A weather strip according to claim 1, wherein said at least one rib has a width "W" that is greater than the height H of said adhesive tape.

* * * * *